Dec. 19, 1967     S. E. HATCH ETAL     3,359,066
CALCIUM FLUORIDE OPTICAL ELEMENTS AND METHOD FOR MAKING SAME
Filed July 27, 1961                                  4 Sheets-Sheet 1
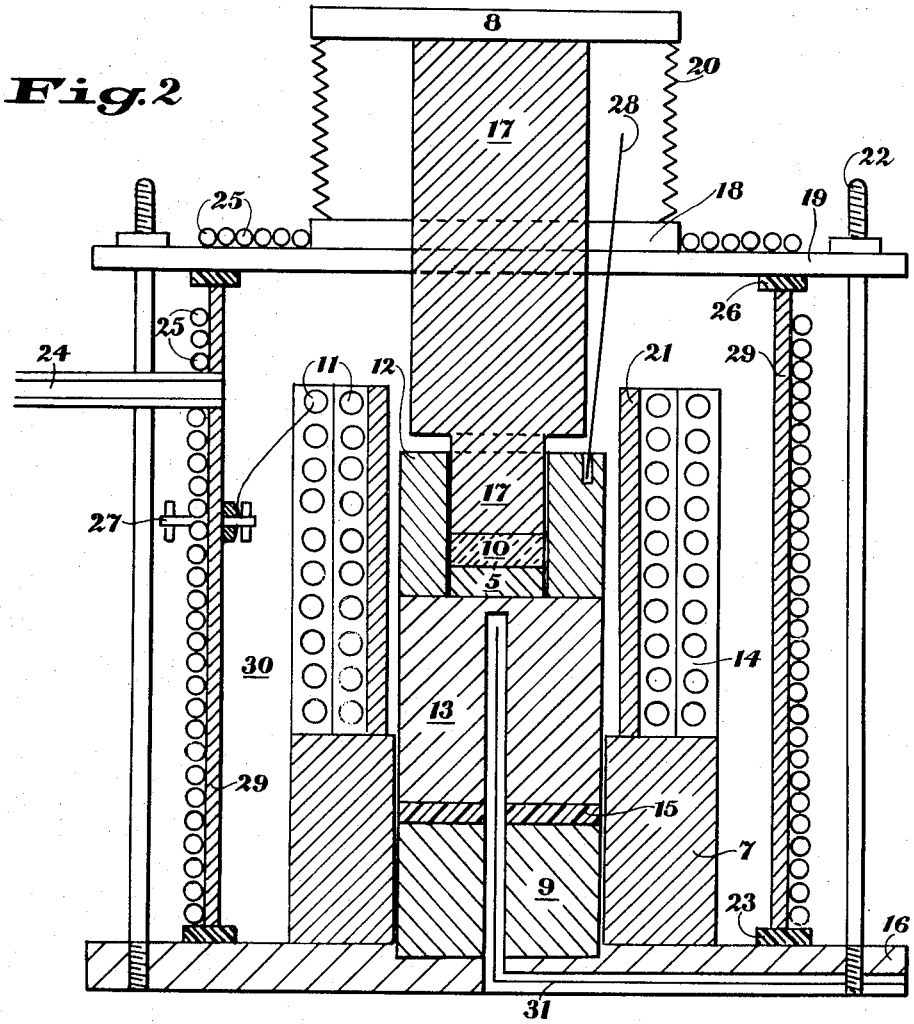
Sherley E. Hatch
Robert J. Weagley
INVENTORS
ATTORNEYS Dec. 19, 1967          S. E. HATCH ETAL          3,359,066
CALCIUM FLUORIDE OPTICAL ELEMENTS AND METHOD FOR MAKING SAME
Filed July 27, 1961                          4 Sheets-Sheet 2
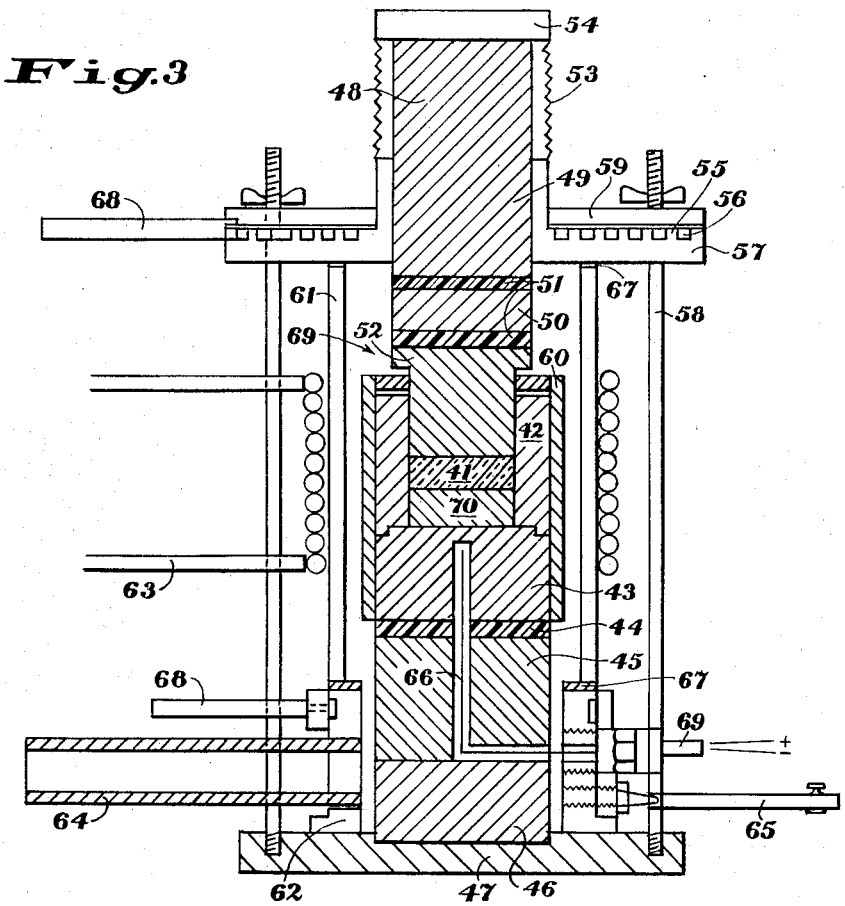
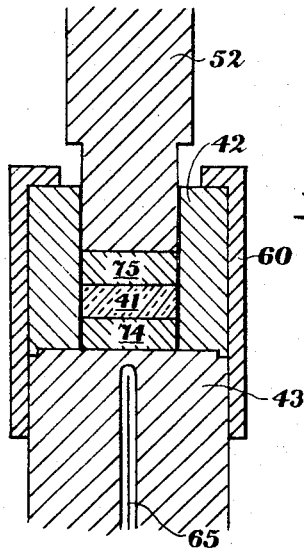
Sherley E. Hatch
Robert J. Weagley
INVENTORS
ATTORNEYS

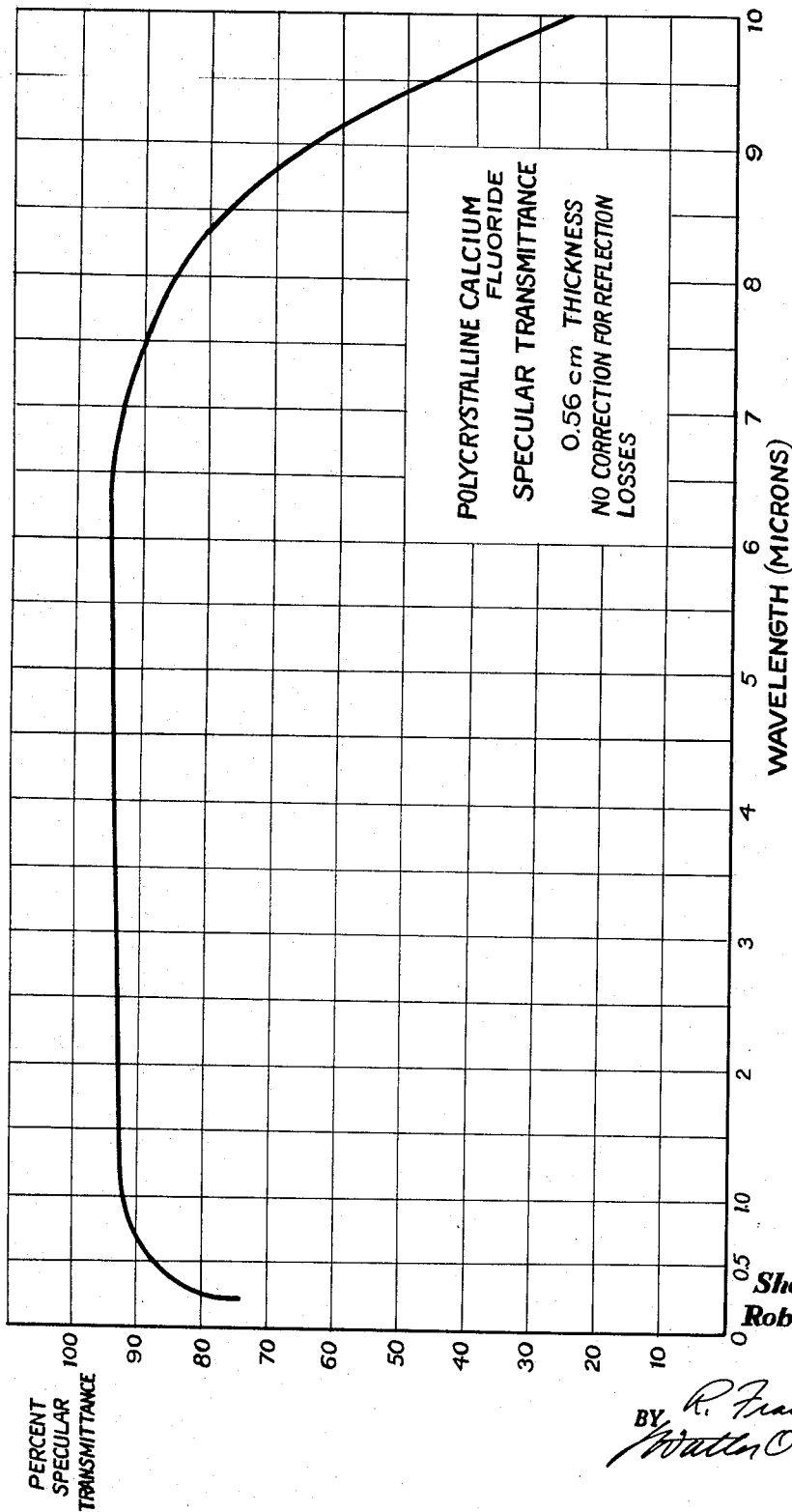

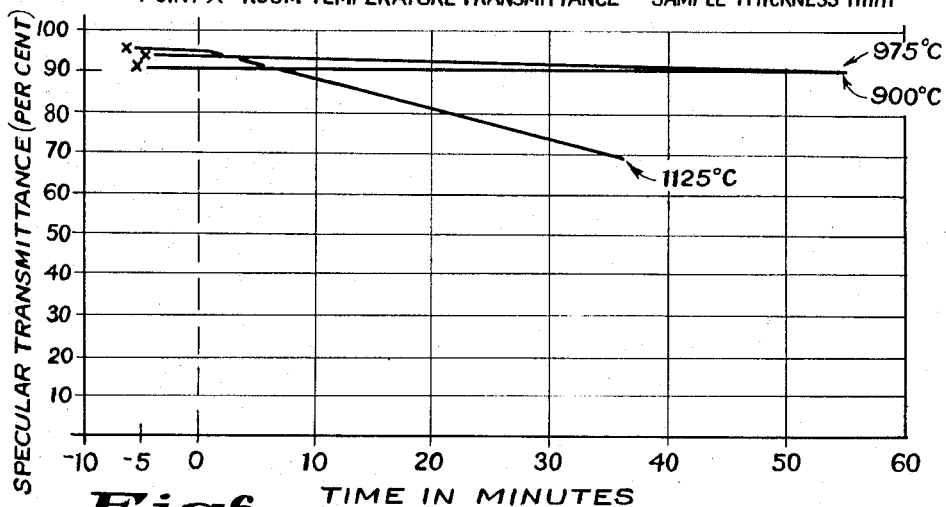
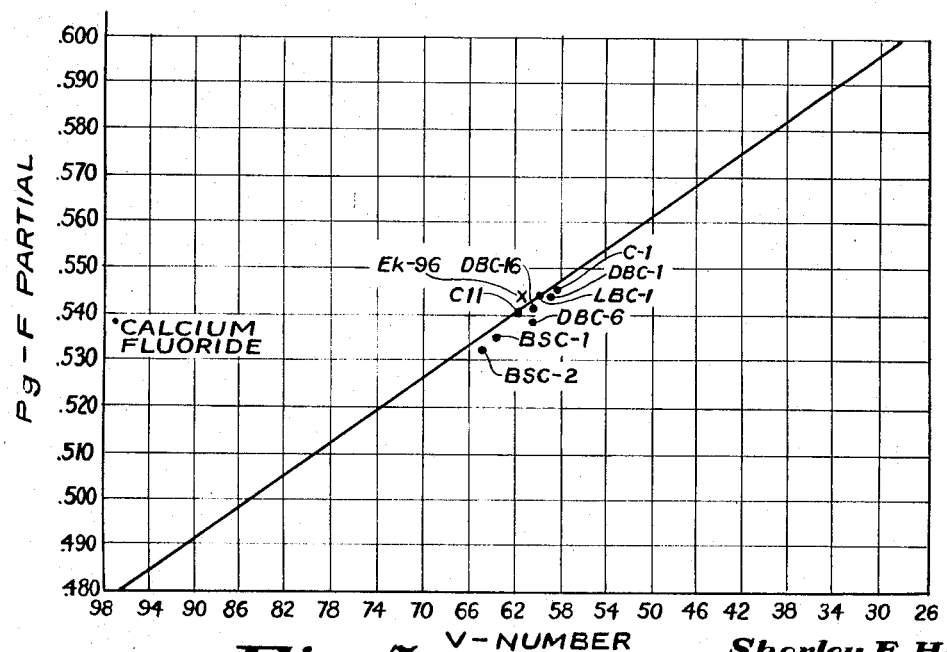

United States Patent Office 3,359,066
Patented Dec. 19, 1967

3,359,066
CALCIUM FLUORIDE OPTICAL ELEMENTS AND
METHOD FOR MAKING SAME
Sherley E. Hatch and Robert J. Weagley, Rochester, N.Y., assignors to Eastman Kodak Company, Rochester, N.Y., a corporation of New Jersey
Filed July 27, 1961, Ser. No. 127,209
2 Claims. (Cl. 23—88)

This invention relates to optical elements and to methods and apparatus for making optical elements. More particularly, this invention relates to methods for hot pressing transparent, polycrystalline optical elements of various geometrical shapes from calcium fluoride powder, which elements transmit over a broad range of the electromagnetic spectrum.

The present invention is illustrated in connection with the apparatus and methods employed for hot pressing calcium fluoride powder under conditions of vacuum and high temperature into a homogeneous solid of transparent polycrystalline calcium fluoride which exhibits improved stability to thermal shock and temperature extremes.

While polycrystalline calcium fluoride has heretofore been made into various non-transparent refractory articles, to our knowledge no one has previously produced hot pressed transparent polycrystalline optical elements consisting of calcium fluoride which have good microwave, infrared and visible transmitting ability and other desirable properties including improved resistance to thermal shock and temperature extremes.

An object, therefore, of this invention is to provide an article of manufacture consisting of transparent, polycrystalline calcium fluoride.

Another object is to provide a transparent, homogeneous solid of polycrystalline calcium fluoride having a density of from 99% up to and including theoretical density.

Still another object is to provide an optical element of transparent polycrystalline calcium fluoride which transmits in the visible and infrared regions of the electromagnetic spectrum.

Yet another object is to provide an infrared transmitting element consisting of transparent polycrystalline calcium fluoride which will be suitable for use for visible and photographic optics as well as for infrared windows in missiles, projectiles and related devices.

Another object is to provide a method of hot pressing calcium fluoride to form such optical elements.

Another object is to provide novel apparatus for molding such calcium fluoride optical elements.

Other objects will appear hereinafter.

In accordance with a feature of this invention, novel apparatus particularly adapted to mold calcium fluoride powder into a dense, transparent optical unit at high temperatures and pressures in a moderate to a high vacuum atmosphere is described. For some purposes, an inert atmosphere can be employed.

A further feature of this invention is a method of compression molding calcium fluoride into a transparent, polycrystalline solid.

This invention will be further understood by reference to the following detailed description in which:

FIG. 1 is a view of a transparent polycrystalline solid of calcium fluoride.

FIG. 2 is an elevational view, partly in section, of a device for compression molding the calcium fluoride powder in accordance with this invention.

FIG. 3 is an elevational view, partly in section, of another device for forming polycrystalline calcium fluoride windows which employs a high frequency induction coil as the heating means.

FIG. 4 is an elevational view, partly in section, of a portion of a molding apparatus similar to that of FIG. 3 showing the use of two insert blocks in the molding cylinder.

FIG. 5 is a graph showing the specular transmittance of polycrystalline calcium fluoride prepared in accordance with the present invention.

FIG. 6 is a graph showing the specular transmittance of polycrystalline calcium fluoride at three microns as a function of time for various temperatures.

FIG. 7 is a graph of the P$g$-F Partial vs. V-Number plot for several optical materials including hot pressed calcium fluoride.

The molding apparatus shown in FIG. 2 comprises a base 16, a silicone gasket 23, a block 9, a thermal insulator 15, a block 13, a molding cylinder 12, a mold insert block 5, a molding plunger 17 having a head 8 which is adapted to be attached to a prime mover, not shown, such as the piston of a hydraulic press to move the plunger 17 vertically into and out of the molding cylinder 12 and thereby press the calcium fluoride powder into the solid unit shown at 10.

The head 8 is attached to aligning ring 18 by metal bellows 20, thereby providing for motion of the piston and maintenance of a vacuum seal around the upper portion of the plunger 17.

A cylinder 21 encloses the molding cylinder 12 and plunger 17 and is supported on block 7. A heating unit 14 comprising a refractory casing is positioned around cylinder 21 and is also supported on block 7 and contains electric heating coils 11, the terminals for which are shown at 27. A cylinder 29 is positioned concentrically in respect to cylinder 21 and forms a vacuum chamber 30, the ends of which are closed by gaskets 23 and 26 and plates 16 and 19. Cooling coils 25 are positioned in contact with the outer surface of cylinder 29 and top plate 19. A conduit 24 connects the vacuum chamber 30 to a suitable vacuum system, not shown. The assembly is further secured by the coaction of top plate 19 and threaded rods 22 and base plate 16.

The temperature is measured by either one or by both of the thermocouples 28 and 31 which are suitably located in channels respectively positioned adjacent to the molding position.

The blocks 9, 13 and cylinder 12 may be made of molybdenum, molybdenum alloys, or other suitable materials having high strength at elevated temperatures. Block 5 may be made of molybdenum, molybdenum alloys, graphite, high density alumina, stainless steel, and high strength nickel base alloys.

A method for hot pressing of calcium fluoride powder to form a transparent, polycrystalline article is described in connection with this apparatus. Calcium fluoride powder is placed in the molding cylinder 12 and is supported on block 5 beneath plunger 17 and the apparatus is assembled as shown in FIG. 2. The calcium fluoride is first cold pressed. A pressure of 20,000 to 30,000 p.s.i. is exerted by the plunger 17 on the calcium fluoride powder for a few minutes to compact the powder into a firm compact. The plunger is then withdrawn and any excess or loose powder is removed by the operator. This cold pressing operation serves to form a level charge and also enables this preliminary pressed mass to heat more easily since heat is conducted through the compacted powder more efficiently than through unpressed powder.

However, suitable transparent, polycrystalline calcium fluoride articles can be manufactured by omitting the above-described preliminary cold pressing step and using only the hot pressing procedures now described.

The molding apparatus is again assembled as shown in FIG. 2 and is attached to a suitable vacuum system, not shown, by means of pipe 24, and chamber 30 is evacuated to 0.4 mm. to $1 \times 10^{-5}$ mm. of mercury. Cooling water is circulated through the cooling coils 25 from a source, not shown, and electric current is supplied to the heater coils 11 through terminals 27. The temperature of the mold is monitored by means of platinum-rhodium thermocouples 28 and 31. When the temperature reaches 1500° F. as indicated by thermocouple 31, molding force is applied to the head 8 of plunger 17 by a hydraulic press, not shown, and over approximately a one-minute period, pressure is built up to approximately 40,000 pounds per square inch.

The pressure on the calcium fluoride is maintained at 40,000 pounds per square inch for 15 to 20 minutes while the indicated temperature is held at approximately 1500° F.

Due to the nature of the thermocouple technique, the indicated temperature for optimum results may vary from apparatus to apparatus by as much as approximately ±10%. During the heating up period, the equipment gases off and the vacuum falls to approximately 0.5 mm. but gradually recovers to the 0.2 mm. range as the adsorbed gases are driven off and expelled.

At the end of the pressing step, the electric power is shut off, the pressure is released over a period of a few seconds to several minutes and the apparatus allowed to cool to room temperature, 70° F.

The resulting calcium fluoride window is then removed from the molding apparatus and employed as desired. It is a transparent, polycrystalline solid within the range of 99% up to the theoretical density.

Referring to FIG. 3, there is shown an elevational view, partly in cross-section, of another modification of the molding apparatus which employs high-frequency heating.

The transparent polycrystalline solid of calcium fluoride is shown at 41. This apparatus comprises molding cylinder 42, mold insert block 70, molding block 43, insulator 44 and supporting blocks 45 and 46. Block 46 rests on base 47. A graphite sleeve, or susceptor 60, is positioned between induction heating coils 63 and members 42 and 43. Also positioned on and sealed to base 47 is a cylindrical chamber 62 through which vacuum conduit 64, a vacuum release conduit 65 and a thermocouple conduit 69 extend. Water pipes 68 connect the chamber 62 and cooling channels 56, to a water supply, not shown. The thermocouple is shown at 66. A quartz cylinder 61 is positioned between members 62 and 57 and is separated therefrom by gaskets 67. Cylinders 61 and 62 thus form a vacuum chamber 69, the upper portion of which is closed by plate 57 having water cooling channels 56 therein.

A gasket 55 forms the upper surface of the channels 56 and is held in position by clamping plate 59. The assembly is clamped by a plurality of clamping rods 58 and cooperating wing nuts.

The molding plunger assembly 48 extends through an aligning aperture in plate 57. Freedom of motion and a vacuum seal are achieved by means of metal bellows 53, the ends of which are sealed respectively to the head 54 of the plunger 48 and to plate 57.

The molding plunger assembly 48 comprises three sections; section 49 is preferably made of Nichrome or stainless steel; section 50 of Nichrome and section 52 of molybdenum or molybdenum alloys. Thermal insulators 51 are positioned between sections 49 and 50 and between sections 50 and 52. The various plunger sections are held together by threaded pins.

Top plates 57 and 59 and the base plate 47 may be of aluminum. Cylinder block 42, block 43 and plunger 52 preferably are of molybdenum or molybdenum alloys, block 45 of Nichrome and block 46 of stainless steel. The insulators 44 and 51 are of Transite or of material of similar or superior thermal insulating properties which will withstand the high temperatures and pressures involved.

Since molybdenum does not couple the high-frequency field efficiently, a graphite sleeve 60, which fits snugly over the molding cylinder, is employed. The high-frequency field couples and heats the graphite which in turn heats the molding cylinder by thermal conduction.

If a situation arises in which it is desirable to eliminate the graphite susceptor 60, it is preferable to make the plunger section 52, cylinder 42 and block 43 of a material which couples efficiently with the high-frequency field. Materials used as the high temperature nickel base alloys may be used.

The apparatus of FIG. 3 is operated substantially the same schedule of temperature, pressure and vacuum as described above, but due to the high-frequency heating, the heating cycle can be considerably reduced.

The previous descriptions of the pressing operations give what appear to be optimum results. However, satisfactory windows have been obtained using indicated temperatures from 1400° F. to 1700° F. The use of temperatures below 1400° F. with the time and pressure discussed above may impair the short wavelength transmission of the calcium fluoride. By increasing the length of the pressing cycle, and/or increasing the pressure, satisfactory windows have been obtained at temperatures below 1400° F. Temperatures in excess of 1500° F. do not appear to contribute to the quality of the pressed article.

Pressures have been varied from 30,000 to 50,000 p.s.i. Pressures less than 30,000 p.s.i. with the normal time cycle and temperature discussed above may result in a window that is not completely pressed to a homogeneous mass. Any pressure in excess of 40,000 p.s.i. does not contribute substantially to the quality of the window.

The time at pressing temperature has been varied within the limits of five and forty-five minutes. At times less than five minutes, the window may not be completely pressed out. Times in excess of fifteen minutes do not seem to improve the quality of the window. However, as mentioned above, increased time at the pressing temperature does allow the hot pressing process to be performed at lower temperatures and for lower pressures.

Edge chipping and cracking of the pressed calcium fluoride article during the pressing operation is a particularly serious problem. It appears these disadvantageous results may be caused by a thin layer of calcium fluoride being formed, under the hot pressing conditions, when employing the apparatus of FIG. 3, in the small space between plunger 52 and the inner wall of the molding cylinder 42 and similarly between the insert 70 and the inner wall of the molding cylinder 42.

Referring to FIG. 4, there is shown a modification of the apparatus of FIG. 3 which is particularly adaptable to prevent edge chipping and cracking in the pressed calcium fluoride article.

We have found if the plunger and insert are made from a material with a lower expansion coefficient than calcium fluoride, cooling from the hot pressing temperature may cause this layer of calcium fluoride to break away from the pressed sample, leaving chips around the periphery of the sample. These chips may then act as sources for cracks which can run through the interior of the pressed article.

We have found the addition of two mold block inserts as is now described in connection with FIG. 4 successfully overcomes these difficulties. The two mold block inserts 74 and 75 provide more complete restraint of the calcium fluoride to the volume between these two mold block inserts. This is accomplished by making the inserts of the proper material and dimensions such that under the conditions of heat and pressure employed, the inserts completely fill the inside diameter of the molding cylinder 42. Under these conditions, the flow of calcium fluoride between the inserts and molding cylinder is minimized and the resulting edge chips and cracks are markedly reduced.

Two different approaches have been used to achieve this condition of essentially zero tolerance between the diameters of the inserts and the inside diameter of the molding cylinder. In the first case, the inserts are made from a material which deforms slightly under the hot pressing conditions. The inserts are made with diameters slightly less than that of the molding cylinder to allow easy insertion. When the mold is raised to the hot pressing temperature and pressure applied, the vertical force exerted on the inserts by the plunger causes their diameters to increase slightly until they equal the inside diameter of the molding cylinder. In the second case, an insert material is selected which has a greater thermal coefficient of expansion than the molding cylinder. Since the diameter of the inserts will increase at a greater rate than the cavity of the molding cylinder, their diameter can be such as to allow easy insertion at room temperature and yet completely fill the space between the inserts and the cylinder walls at the temperature used in the hot pressing.

In either of the above cases, motion of the top mold block insert 75 is insured by coating the inner walls of the molding cylinder with graphite. Some insert materials may bond to the calcium fluoride or to the adjacent mold parts. This problem can be avoided by coating the entire insert with a layer of graphite. Satisfactory inserts may be made of solid graphite, high density alumina, stainless steel and several high strength nickel-chromium alloys.

The calcium fluoride used imposes limits on the hot pressing operation. Good windows have been pressed from single crystal fragments whose average particle size has ranged from less than 10 microns to several millimeters. Acceptable windows have also been pressed from calcium fluoride powder prepared in the laboratory from analytical reagent grade chemicals. It has also been possible to press acceptable windows from commercially available analytical reagent grade calcium fluoride after suitable treatment. While fragments of synthetic calcium fluoride crystals may be directly hot pressed to form a polycrystalline solid, pieces of natural crystalline calcium fluoride containing appreciable amounts of impurity may also be used for practically all purposes. These crystals are powdered to allow removal of second phase impurities, as by acid washing, and the resulting powder hot pressed as described above. Optimum pressing conditions may, of course, vary somewhat between the different starting materials used.

Plano-convex pressings can be made using calcium fluoride by hot pressing the powder into a concave mold with a flat plunger using the same general apparatus and method described in connection with FIGURE 2 under the same temperature and pressure conditions. The resulting piece of calcium fluoride is strong and possesses all the properties described above, and it can be ground and polished to form a lens, dome or similar optical component. Similarly, a concave-convex meniscus shaped piece can be formed which also may be employed as a dome for a missile or other device for use in outer space. By the same token, using molds with polished aspheric surfaces, aspheric optical components can be economically produced.

Hot-pressed pieces of calcium fluoride can be shaped further after hot-pressing has been completed. For example, a cylindrical disc of hot pressed calcium fluoride having a diameter of 1.118″±.001 and a thickness of .300″ polished was centered on the base in the cylinder of the molding apparatus having a two-inch diameter. Molybdenum foil .005″–.010″ thick coated with graphite was used as a release cushion both on top and bottom of sample. Under pressure of approximately 15 pounds per square inch, the disc was heated to 1650° F., indicated and held at this temperature for 10–15 minutes. At the end of this period, pressure was applied very carefully and slowly by adjusting needle valves until the height gauge which was attached to apparatus showed a precalculated change in dimension. When this figure was reached, the pressure was approximately equal to 5000 p.s.i. on the sample. These conditions were held for 15–20 minutes. The sample was programmed to cool slowly to 1350° F., then the power was shut off. An argon atmosphere was established and the equipment cooled to approximately 400° F. before removal. Samples were then approximately 1.250″ in diameter and approximately .225″ thick. Thus, the diameter of the sample was changed by .132″. Samples showed a normal hot-pressed strain pattern which can be removed by annealing.

This serves to illustrate the moldability of hot-pressed calcium fluoride which can be applied to molding spherical and aspherical optical surfaces, etc. at pressures of only 5000 p.s.i. It also illustrates that thick cylindrical pieces of small diameter can be formed into thinner pieces of larger diameter at low pressure.

Many possible uses are envisioned for hot pressed polycrystalline calcium fluoride windows in both the infrared and visible wavelength regions. Its high infrared transmission makes it a prospect for domes and windows in missiles and related devices. Its exceptionally low dispersion in the visible wavelength region make it very desirable material for visible optics.

*Properties of hot pressed polycrystalline calcium fluoride*

The hot pressed calcium fluoride takes good optical polish. The material is essentially water white and has high transmission throughout the wavelength range .25 to 9 microns, and greater than 90% in the range 1 to 7 microns as shown on the attached curve shown in FIG. 5. Interferometric tests show the windows to be optically homogeneous. Refractive index measurements show very close agreement between the values obtained from hot pressed calcium fluoride and those published for a single crystal calcium fluoride. As a result of much improved grinding and polishing mechanical stability, we believe the mechanical strength of hot pressed calcium fluoride is substantially stronger than single crystal calcium fluoride.

When removed from the mold, after the pressing cycle described above, the molded pieces show considerable strain when viewed on a conventional polariscope. It is possible to remove this strain by a proper furnace anneal. It is also possible to remove the strain by modifying the cooling portion of the hot pressing cycle to simulate a furnace anneal.

When removed from the mold, the hot pressed calcium fluoride samples in most instances show a high level of strain when viewed on a conventional polariscope. In particular cases where this strain is objectionable, it may be removed by annealing. A typical annealing cycle is as follows.

The pressed sample which had a thickness of 0.300 inch and a diameter of 1.125 inches, is placed in a furnace, heated to 1500° F., held at 1500° F. for approximately 20 minutes, then cooled at a rate of 125° F./hr. Samples annealed in this manner show no detectable strain on a conventional polariscope. Variations of the annealing program may be made depending on the extent of annealing desired. For example, if the cooling rate is increased to 400° F./hr., the strain level after the anneal is barely detectable on a polariscope. The optimum annealing cycle also varies with the size of the sample. In order to avoid a slight surface oxidation, it is often desirable to perform the anneal in an inert atmosphere, or vacuum.

The specular transmittance, over the range 0.25 to 10 microns, of polycrystalline calcium fluoride, made as described herein, is shown in FIG. 5. The specular transmittance at 3 microns of polycrystalline calcium fluoride, made as described herein, is shown in FIG. 6 as a function of time at various temperatures.

As mentioned previously, the exceptionally low dispersion (V-Number 95) of polycrystalline calcium fluoride is particularly desirable in lens design. Another interesting characteristic of such calcium fluoride is the relation between its Pg-F Partial and its V-Number. Where Pg-F Partial is defined by $$Pg\text{-}F = \frac{n_g - n_F}{n_F - n_C}$$

and V is defined by $$V = \frac{n_D - 1}{n_F - n_C}$$

where further, $n_g$ is the refractive index at a wavelength of 4359 A.,
$n_F$ is the refractive index at a wavelength of 4861 A.,
$n_C$ is the refractive index at a wavelength of 6563 A.,
$n_D$ is the refractive index at a wavelength of 5893 A.

As can be seen from the attached curve of Pg-F Partial vs. V-Number, shown in FIG. 7, most materials are lolocated very close to the straight line shown on the curve. Lens designers are very interested in optical materials which depart from the straight line and yet have the same Pg-F Partial as available optical glasses. Note from FIG. 7 that hot pressed polycrystalline calcium fluoride has very nearly the same Pg-F Partial as the common glasses BSC–1, BSC–2, C–11, DBC–6, DBC–16, but a much higher V value. It has been long known that calcium fluoride offers exceptional optical properties, but its poor mechanical properties have prevented its use as a practical optical material. Calcium fluoride crystals cleave easily, and hence are very susceptible to fracture. Although no quantitative measurements have been made on hot pressed calcium fluoride, its mechanical strength appears to be superior to single crystal calcium fluoride. For example, it easily survives conventional grinding and polishing procedures. The reason for the superior mechanical properties of hot pressed polycrystalline calcium fluoride is not completely understood at present, but it may be associated with the fine polycrystalline structure and with the deformation and work hardening of the small crystallites during the hot pressing process.

Hot pressed polycrystalline calcium fluoride exhibits good high temperature stability and oxidation resistance. Samples have been exposed to temperatures up to 1500° F. in air for extended periods with little or no loss in infrared transmission.

Polycrystalline calcium fluoride is quite insoluble in water, hence, it performs satisfactorily in humidity tests. The most thermally resistant material produced to date will withstand the thermal shock of being heated to 200° C., then dropped into water at 25° C.

The theoretical density of the hot pressed polycrystalline calcium fluoride crystals is measured as follows:

The density of calcium fluoride was measured by the hydrostatic weighing method as described on page 104 in Chapter III on density in A. Weissberger's Physical Methods of Organic Chemistry, vol. 1, Interscience Publishers, Inc., N.Y. (1945). This method is widely recognized as suitable for high precision density measurements of solids and is also described in Section 4.1.3.3 of vol. 6, Part A of Methods of Experimental Physics, Academic, Press, New York (1959).

Deviations from theoretical density are indicative of second phase inclusions in the pressing such as impurities or porosity.

We claim:

1. An article of manufacture consisting of a homogeneous unitary solid of polycrystalline calcium fluoride hot pressed from particles of powder size, said article having specular transmission in the visible and infrared region of the electromagnetic spectrum and a density in the range of at least 99% up to and including theoretical density, said article of manufacture being characterized by specular transmission such that a sample 0.56 cm. thick exhibits transmission in the range of 1 to 7 microns greater than 90% without correction for reflection losses.

2. An article of manufacture consisting of a homogeneous unitary solid of polycrystalline calcium fluoride hot pressed from particles of powder size, said article having specular transmission in the visible and infrared region of the electromagnetic spectrum and a density in the range of at least 99% up to and including theoretical density, said article of manufacture having been hot pressed at a temperature of 1400 to 1700° F. and a pressure greater than 15,000 pounds per square inch.

References Cited

UNITED STATES PATENTS

| | | | |
|---|---|---|---|
| 2,091,569 | 8/1937 | Ridgway et al. | 25—156 |
| 2,303,783 | 12/1942 | Adamoli | 23—88 |
| 2,332,674 | 10/1943 | Smith | 18—17 |
| 2,335,325 | 11/1943 | Wainer | 25—156 |
| 2,362,430 | 11/1944 | Buerger | 264—66 X |
| 2,460,334 | 2/1949 | Buerger et al. | 264—66 X |
| 2,544,414 | 3/1951 | Bridgman et al. | 18—17 |
| 2,550,173 | 4/1951 | Swinehart et al. | 23—88 |
| 2,592,113 | 4/1952 | Brodal et al. | 23—88 |
| 2,800,389 | 7/1957 | Mockrin | 23—88 |
| 3,114,601 | 12/1963 | Letter | 23—88 |
| 3,178,307 | 4/1965 | Carnall et al. | 23—91 X |

OTHER REFERENCES

J. W. Mellor: "A Comprehensive Treatise on Inorg. and Theoretical Chem.," vol. 4, 1923, page 296, Longmans, Green & Co., New York.

OSCAR R. VERTIZ, *Primary Examiner.*

ROBERT F. WHITE, MAURICE A. BRINDISI, EDWARD STERN, MILTON WEISSMAN, *Examiners.*

G. A. KAP, *Assistant Examiner.*